(12) United States Patent
Kang et al.

(10) Patent No.: US 9,204,350 B2
(45) Date of Patent: Dec. 1, 2015

(54) METHOD AND SYSTEM FOR HANDOVER OF TERMINAL

(75) Inventors: Chang-Soon Kang, Changwon-si (KR); Tien-Dung Nguyen, Changwon-si (KR)

(73) Assignee: INDUSTRY-ACADEMIC COOPERATION FOUNDATION, CHANGWON NATIONAL UNIVERSITY, Changwon-Si (KR)

( * ) Notice: Subject to any disclaimer, the term of this patent is extended or adjusted under 35 U.S.C. 154(b) by 514 days.

(21) Appl. No.: 13/472,795

(22) Filed: May 16, 2012

(65) Prior Publication Data

US 2013/0143572 A1      Jun. 6, 2013

(30) Foreign Application Priority Data

Dec. 1, 2011    (KR) ........................ 10-2001-0127683

(51) Int. Cl.
*H04W 36/00* (2009.01)
*H04W 36/08* (2009.01)
*H04W 36/22* (2009.01)
*H04W 36/04* (2009.01)
*H04W 84/04* (2009.01)

(52) U.S. Cl.
CPC .............. *H04W 36/08* (2013.01); *H04W 36/22* (2013.01); *H04W 36/04* (2013.01); *H04W 84/045* (2013.01)

(58) Field of Classification Search
CPC .................... H04W 28/0226; H04W 36/0083; H04W 36/0094; H04W 36/0005; H04W 36/0016
USPC ........................... 455/436–444; 370/321–334
See application file for complete search history.

(56) References Cited

U.S. PATENT DOCUMENTS

| | | | |
|---|---|---|---|
| 6,496,493 B1 * | 12/2002 | Chung | 370/332 |
| 8,537,776 B2 * | 9/2013 | Higashide | 370/331 |
| 2008/0305801 A1 * | 12/2008 | Burgess et al. | 455/444 |
| 2009/0247167 A1 * | 10/2009 | Higashide | 455/436 |
| 2010/0093358 A1 * | 4/2010 | Cheong et al. | 455/444 |
| 2010/0260068 A1 * | 10/2010 | Bhatt et al. | 370/254 |
| 2011/0007690 A1 * | 1/2011 | Chang et al. | 370/328 |
| 2011/0047029 A1 * | 2/2011 | Nair et al. | 705/14.52 |

* cited by examiner

*Primary Examiner* — Ronald Eisner
(74) *Attorney, Agent, or Firm* — Porzio, Bromberg & Newman, P.C.

(57) ABSTRACT

In a radio communication system of hierarchical cell structure in which macrocells provided by a macro base station and femto cells provided by a femto base station are overlapped on each other, a method and a system for handing over a terminal are provided. To be specific, if load of a serving base station increase or decreases more than a predetermined extent, a method and a system adaptively adjust the handover between macro base stations, between femto base station, or between femto base station and macro base station.

7 Claims, 8 Drawing Sheets

METHOD AND SYSTEM FOR HANDOVER OF TERMINAL

CROSS-REFERENCE TO RELATED APPLICATIONS

This application claims priority from Korean Patent Application No. 10-2011-0127683, filed on Dec. 1, 2011, in the Korean Intellectual Property Office, the disclosure of which is incorporated herein by reference in its entirety.

BACKGROUND

1. Field of the Invention

An embodiment relates to a method and a system for handover of a terminal in a radio communication system with hierarchy cell architecture in which macrocells and femtocells are overlapped on each other. More specifically, an embodiment relates to a method and a system for adaptively controlling handover between macrocell base stations, between femtocell base stations, or between femtocell base station and macrocell base station, when a serving base station has load increased or decreased by a predetermined degree.

2. Description of the Related Art

A radio communication system uses electromagnetic waves for communication between stationed and mobile radio communication devices such as wireless mobile phone located within a communication coverage area or cell, or laptop computer having radio communication card therein. The base stations are deployed spatially in a geographical service area which is divided into radio cells, to provide radio coverage. In operation, the base stations send out information to a mobile terminal through a down-link radio signal generated therefrom. A terminal located at a predetermined cell sends out the information to a serving base station of the specific cell through up-link radio signal. The base station may have oriented antenna to further divide each cell into different cells or sectors, and each antenna covers one sector. This sectoring of cell increases communication capacity. A variety of radio communication systems, such as a portable device, a mobile phone, a wireless card, a mobile terminal (MT), a user equipment (UE), an access terminal (AT) or a subscriber station (SS), may include one or more base station network to communicate with one or more wireless devices. The base station may be called an access point (AP) or an access network (AN), or included as part of a network. Further, the radio communication system may include one or more access networks to control one or more base stations.

In a radio communication network, a base station may be implemented in multi-tier architecture. By way of example, a base station may be located in a radio cell of another base station to provide the radio coverage of a small part of a radio cell. In this case, because another base station is located in a macrocell area, a larger cell can be considered as macrocell, while the smaller cell within the macrocell can be considered as microcell. This macrocell-microcell architecture may extend the radio coverage of a network, and increase radio frequency band and communication capacity of the network. One macrocell may include one or more microcells depending on need for radio coverage at the macrocell.

Efforts have been made to increase cell capacity and thus support bidirectional service with high capacity service such as multimedia content, streaming, etc., and along with this, approaches to use high frequency band and decrease cell radius have also been made. Using cells such as picocell with narrow cell radius enables use of higher band than the frequency used in conventional radio communication system, and therefore, more information transmission is provided. However, cost increases because more base stations have to be installed in the same area. The femtocell has been recently suggested as one of the approaches to increase cell capacity using small cells.

The femtocell refers to a small scale radio environment in which ultra-small base stations consuming low power are installed inside the home/office building. The femtocell is expected to contribute complete settlement of the next-generation mobile communication system, by providing improved service quality such as improved indoor service coverage and increased capacity.

FIG. 1 is a view illustrating a conventional radio communication system, in which macrocells provided by a macro base station and femtocells provided by a femto base station are overlapped with each other.

Referring to FIG. 1, the femto base station generally has smaller cell coverage than that of macro base station, and whole (not illustrated) or part of the cell coverage of the femto base station can be included in the cell coverage of the macro base station.

FIG. 1 illustrates a situation in which a first terminal 301 and a second terminal 302 receive service from a first macro base station 110 applied as a serving base station. The terminals 301, 302 are mobile and the first terminal 301 is at a location where the cell coverage of the first macro base station 110 overlaps the cell coverage of the adjacent femto base station 200, and the second terminal 302 is at a location where the cell coverage of the first macro base station 120 overlaps the cell coverage of the second macro base station 120.

As explained above, the terminals 301, 302 at locations of overlapping cell coverage between the respective base stations frequently determine whether to hand over to another base station. The first macro base station 110 (i.e., serving base station) or the terminals 301, 302 compare to determine if the strength of the signal ($RSRPM\_i$ or $RSRPF\_i$) received from the adjacent base station (i.e., second macro base station 120) or the femto base station 200 to the terminals 301, 302 exceeds the sum of the strength of the signal ($RSRPS\_k$) received from the serving base station (i.e., first macro base station 110) and the handover threshold, to thereby determine if it is necessary to hand over to the second macro base station 120 or to the femto base station 200. That is, if the strength of the signal ($RSRPF_j$) received from the femto base station 200 is equal to or greater than the strength of the signal ($RSRPS\_k$) received from the femto base station 200 by the handover threshold (HOMF), the first terminal 301 hands over from the first macro base station 110 to the femto base station 200.

In the same situation, the second terminal 302 is at an area where the cell coverage of the first and second macro base stations 110, 120 overlap. In some situations, the strength of the signal ($RSRPM_j$) received from the second macro base station 120 may be greater than the strength of the signal ($RSRPS\_k$) received from the first macro base station 110, but with the difference that does not exceed the handover threshold (HOMM). In these situations, according to the above method for determining whether or not to hand over, the second terminal 302 does not hand over to the second macro base station 120, but keeps being served by the first macro base station 110.

If the number of terminals in the same situation as the second terminal 302 increases, i.e., if the number of terminals which do not hand over to another base station increases, the traffic load of the serving base station 110 may increase to overload state. If this happens, terminals served by the serving base station can have interference therebetween, and the above-explained handover determining method can hardly solve the traffic overload, while the terminals have deteriorated QoS and transmission rates. Accordingly, a method and a system are necessary, according to which terminals 301, 302 can easily hand over to adjacent base stations 120 or 200 when the serving base station is overloaded.

SUMMARY

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

According to one embodiment, a technical objective is to provide a method and a system to prevent deterioration of QoS and transmission rate of base stations and deteriorated stability of communication network, by adaptively adjusting handover between base stations according to the condition of the base stations.

According to another embodiment, a technical objective is to provide a method and a system for preventing deterioration of QoS and transmission rate of a serving base station and deterioration of stability of a communication network, by inducing handover of some of terminals served by the serving base station to adjacent base stations when traffic overload of the serving base station is expected.

In one embodiment, a base station may include a first storage unit which stores parameters for carrying out handover, a traffic management unit which requests adjustment of a handover threshold of a terminal using the parameters stored at the first storage unit, based on traffic status of the base station, and a first handover management unit which broadcasts a request for adjusting the handover threshold to one or two or more terminals served by the base station, if a request for adjusting the handover threshold of the terminal is received from the traffic management unit.

The parameters for carrying out handover stored at the first storage unit may include one or two or more selected from among: traffic load periodically measured from the base station; traffic overload threshold; traffic stability threshold; traffic load information of adjacent base stations received from the adjacent base stations; handover threshold of the terminal; planned handover threshold; and identification information of a target base station intended for handover.

The traffic overload threshold may be varied to or above an average traffic load of the adjacent base stations.

The traffic management unit may request the first handover management unit to adjust (down) the handover threshold of the terminal, if the traffic load stored at the first storage unit exceeds the traffic overload threshold.

The traffic management unit may request the first handover management unit to adjust (down) the handover threshold of the terminal, if the traffic load stored at the first storage unit exceeds the traffic overload threshold and if the handover threshold of the terminal equals to the planned handover threshold.

The traffic management unit may request the first handover management unit to adjust (up) the handover threshold of the terminal, if the traffic load stored at the first storage unit is below the traffic stability threshold, and if the handover threshold of the terminal is different from the planned handover threshold.

The first handover management unit may broadcast a request for adjusting the handover threshold to one or two or more terminals served by the base station, by sending out a command message directing to adjust the handover threshold.

In one embodiment, a terminal may include a second storage unit which stores parameters for implementing a request for handover, and a second handover management unit which adjusts a handover threshold of the terminal or requests handover to another base station, using the parameters stored at the second storage unit.

The parameters for implementing the request for handover stored at the second storage unit may include one or two or more selected from among: handover threshold, planned handover threshold, amount of handover threshold adjustment; strength of signal periodically measured from a serving base station; and strength of signal from adjacent base station. The handover threshold, the planned handover threshold and the amount of handover threshold adjustment may vary depending on whether the target base station is a macro base station or a femto base station.

The second handover management unit may increase or decrease the handover threshold stored at the storage unit as much as the amount of handover threshold adjustment, if a request for adjusting the handover threshold is received from a serving base station.

The second handover management unit may decrease the handover threshold as much as the amount of handover threshold adjustment, if a request for decreasing the handover threshold is received from a serving base station and if it is determined that the handover threshold stored at the storage unit equals to a planned handover threshold.

The second handover management unit may select an adjacent base station with a strongest signal by using strength of signal received from adjacent base stations and stored at the storage unit, and if determining that the strength of signal from the selected base station exceeds a sum of the strength of signal from a serving base station and the handover threshold, requests handover to the selected base station.

In one embodiment, a method for requesting adjustment of a handover threshold of a terminal may include measuring a traffic load of a base station, determining whether the traffic load of the base station is in overload state or in stable state, using the measured traffic load, if the traffic load of the base station is in overload state, requesting to adjust (down) a handover threshold of a terminal, and if the traffic load of the base station is in stable state, requesting to adjust (up) the handover threshold of the terminal.

The method may include if the traffic load of the base station is in overload state, determining if the handover threshold of the terminal equals to a planned handover threshold, and if the traffic load of the base station is in overload state and the handover threshold of the terminal equals to the planned handover threshold, requesting to adjust (down) the handover threshold of the terminal.

The method may include if the traffic load of the base station is in stable state, determining if the handover threshold of the terminal is different from a planned handover threshold, and if the traffic load of the base station is in stable state and the handover threshold of the terminal is different from the planned handover threshold, requesting to adjust (up) the handover threshold of the terminal.

In one embodiment, a method for requesting handover of a terminal may include determining if a request for adjusting a handover threshold is received from a serving base station, adjusting the handover threshold if the request is received, selecting an adjacent base station with a strongest signal strength from among signals received from adjacent base stations, determining if the strength of a signal received from the selected base station exceeds a sum of the strength of a signal received from the serving base station and the handover threshold, and if the strength of a signal received from the selected base station exceeds the sum of the strength of a signal received from the serving base station and the handover threshold, requesting the serving base station for handover to the selected base station.

In one embodiment, since handover between base stations is adaptively adjusted according to the condition of base stations, better QoS and transmission rate of the base station are provided, while stability degradation of communication network is prevented.

Further, if traffic overload of the serving base station is anticipated, since some of the terminals served by the serving base station are induced to hand over to adjacent base station, better QoS and transmission rate of the serving base station are provided, while stability degradation of communication network is prevented.

BRIEF DESCRIPTION OF THE DRAWINGS

The above and/or other aspects of the present inventive concept will be more apparent by describing certain exemplary embodiments of the present inventive concept with reference to the accompanying drawings, in which.

DETAILED DESCRIPTION OF EXEMPLARY EMBODIMENTS

Figure 1:
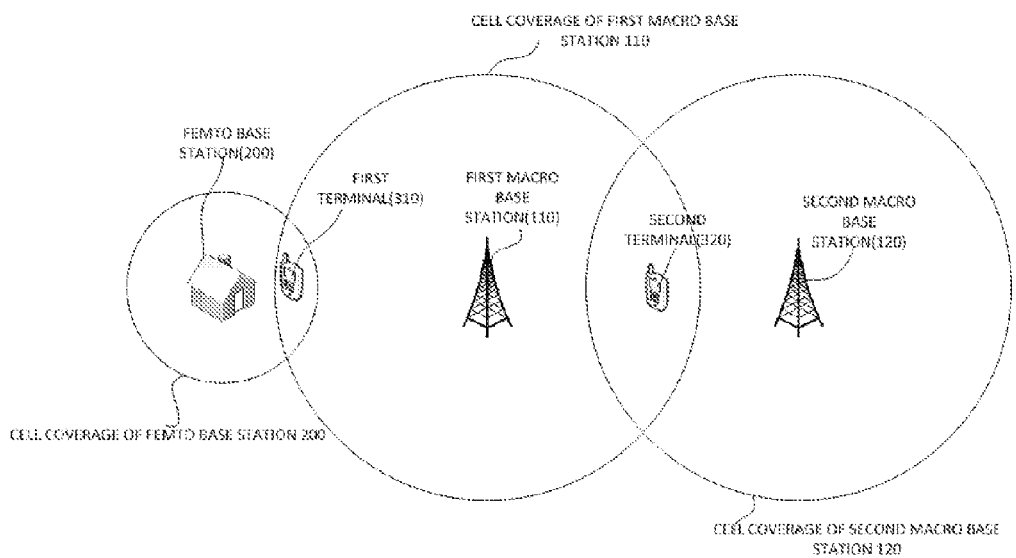
FIG. 1 illustrates a hierarchical cell architecture in a conventional radio communication system in which macrocells provided by a macro base station and femtocells provided by a femto base station are overlapped on each other.

Referring to the drawings, the invention will be described in detail below.

Figure 2:
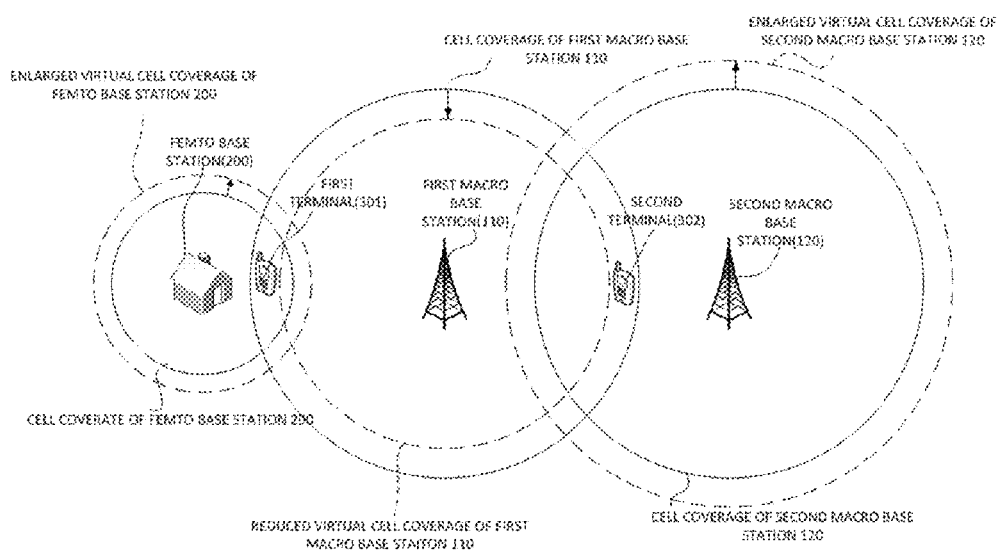
FIG. 2 is a view illustrating a cell coverage in which macrocells of a macro base station and femtocells of a femto base station are adjusted virtually, according to an embodiment.

FIG. 2 is a view illustrating a cell coverage in which macrocells of a macro base station and femtocells of a femto base station are adjusted virtually, according to an embodiment.

Referring to FIG. 2, the first and second terminals 301, 302 are served by the first macro base station 110 operating as a serving base station. The terminals 301, 302 are mobile, and the first terminal 301 is located in an area where the cell coverage of the first macro base station 110 and the femto base station 200 overlap, and the second terminal 302 is located in an area where the cell coverage of the first macro base station 110 and the second macro base station 120 overlap.

As illustrated in FIG. 2, in one embodiment, the first macro base station 110 has overloaded traffic, and accordingly, the first macro base station 110 virtually has reduced cell coverage, while the second macro base station 120 and the femto base station 200 virtually have increased cell coverage. As a result, the first terminal 301 is included only in the cell coverage of the femto base station 200, and the second terminal is included only in the cell coverage of the second macro base station 120. As explained above, since the first and second terminals 301, 302 are out of the cell coverage of the first macro base station 110, the first terminal 301 is induced to hand over to the femto base station 200, and the second terminal 302 is induced to hand over to the second macro base station 120.

To be specific, if the first macro base station 110, which is the serving base station, determines traffic overload, the first macro base station 110 broadcasts a request to one or two or more terminals 301, 302 served by the macro base station 110 to (down) adjust the handover thresholds. If the handover thresholds of the respective terminals 301, 302 are adjusted down in response to the request for adjustment, requirements for handing over the terminals 301, 302 to other base stations are lessened, so that the terminals 301, 302 can hand over to other base stations more easily than before the adjustment of the handover thresholds. That is, the cell coverage representing the service area of the first macro base station 110 (i.e., serving base station) virtually decreases, while the cell coverage of the other base stations extend. As a result, the first terminal 301 is included only in the cell coverage of the femto base station 200, and the second terminal is included only in the cell coverage of the second macro base station 120. As explained above, as the first and second terminals 301, 302 are out of the cell coverage of the first macro base station 110, the first terminal 301 is induced to hand over to the femto base station 200, and the second terminal 302 is induced to hand over to the second macro base station 120.

As explained above, by adjusting (down) the handover threshold of the terminals 301, 302, some of the terminals in the service area of the serving base station can hand over to the other base stations. Since the macro base station and the femto base station have different cell coverage, frequency band and electric energy from each other, the handover thresholds, which are stored at the respective terminals, may differ depending on whether the target base station for a terminal to hand over is the macro base station or the femto base station. Likewise, the adjustment of the handover threshold may also differ depending on whether the target base station is macro base station or femto base station.

Figure 3:
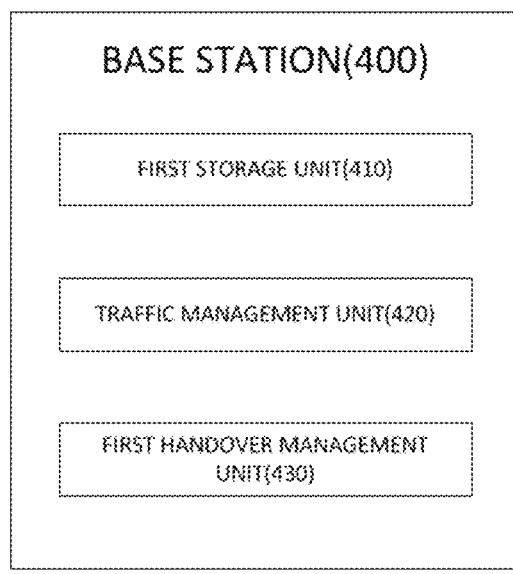
FIG. 3 illustrates the architecture of a base station according to an embodiment.

FIG. 3 illustrates the architecture of a base station according to an embodiment.

The base station is a component of a mobile communication system, and plays a role of relaying communication between a terminal and an exchange station in a service area of the base station. Referring to FIG. 3, the base station 400 according to an embodiment includes a first storage unit 410 which stores parameters for handover, a traffic management unit 420 which requests adjustment of the handover threshold of the terminal 300 using the parameters stored at the first storage unit 410 depending on the traffic status of the base station 400, and a first handover management unit 430 which broadcasts a request for adjusting handover threshold of one or two or more terminals 300 served by the base station 400, if the traffic management unit 420 requests for adjusting the handover threshold of the terminal.

The first storage unit 410 stores parameters for handover. In one embodiment, the parameters may include one or two or more of traffic load, traffic overload threshold and traffic stability threshold. The traffic load of the base station 400 may be measured periodically at predetermined intervals. The predetermined intervals may be shortened, if traffic overload is anticipated. The traffic overload threshold and traffic stability threshold are used as references to check traffic status of the base station 400 based on comparison with the measured traffic load of the base station 400. In one embodiment, the traffic overload threshold may be set to a predetermined ratio (e.g., 70%) of the total load, and the traffic stability threshold may be set to a predetermined ratio (e.g., 60%) of the total load.

Further, in the base station 400 according to an embodiment, the first storage unit 410 may include one or two or more of the handover threshold, planned handover threshold, identification information of a base station targeted to hand over, and traffic load status information of adjacent base stations. The handover threshold of the terminal 300 is used for determining if it necessary to hand over the terminal 300 to the other base station, or to determine if the handover threshold is different when compared with the planned handover threshold. The identification information of the target base station is used for performing handover to the target base station when the terminal hands over from the serving base station to the target base station.

The traffic load status information of the adjacent base station may be used when the base station 400 adjusts the traffic overload threshold and the traffic stability threshold. To be specific, if the traffic overload threshold is fixed at 70% of the total overload, the base station 400 may broadcast a request for adjusting (down) the handover threshold to the terminals 300 served by the base station 400, if the traffic load exceeds 70%. However, if the adjacent base stations of the base station 400 are also overloaded, the terminal 300 cannot receive high quality service even after handing over to another base station due to the traffic overload of another base station. Accordingly, the base station 400 may collect traffic load status information of the adjacent base stations and may adjust the traffic overload threshold so as not to induce impractical handover to the base station with traffic overload. In one embodiment, the base station 400 may change the handover overload threshold to or above the average traffic loads of the adjacent base stations.

If the traffic load stored at the first storage unit 410 exceeds the traffic overload threshold, the traffic management unit 420 may request the first handover management unit 430 to adjust (down) the handover threshold of the terminal 300. In one embodiment, if the traffic load of the base station 400 exceeds the traffic overload threshold and the handover threshold of the terminal 300 equals to the planned handover threshold, the traffic management unit 420 may request the first handover management unit 430 to adjust (down) the handover threshold of the terminal 300. To be specific, if the traffic load of the base station 400 exceeds the traffic overload threshold so that traffic overload is anticipated, the traffic management unit 420 requests the first handover management unit 430 to adjust (down) the handover threshold of the terminal 300. As a result, the cell coverage of the base station 400 is virtually reduced, and the cell coverage of the other base stations is virtually enlarged, and the terminal 300 located on a boundary of the reduced and enlarged cell coverage is induced to hand over to another base station.

Further, in one embodiment, the frequency of requesting (down) adjustment of the handover threshold may be limited to one or more times. The frequency of adjusting (down) the handover threshold may be limited to one time so that the handover threshold can have a difference with the planned handover threshold as much as the maximum handover threshold adjustment. Alternatively, if the traffic load of the serving cell is not recovered to stable state even after one time of handover threshold (down) adjustment, the handover threshold may be adjusted (down) repetitiously, but until the traffic load of the serving cell is recovered to stable state. This limit is applied to prevent rapidly increasing traffic loads of the adjacent base stations and subsequently unstable communication network because, if the handover threshold (down) adjustment is unlimitedly repeated, virtual cell coverage of a specific base station can be excessively reduced, causing too many terminals to hand over to the adjacent cells at once.

If the traffic load stored at the first storage unit 410 is below the traffic stability threshold, the traffic management unit 420 may request the first handover management unit 430 to adjust (up) the handover threshold of the terminal 300. In one embodiment, if the traffic load of the base station 400 is below the traffic stability threshold, and if the handover threshold of the terminal 300 is different from the planned handover threshold, the traffic management unit 420 may request the first handover management unit 430 to adjust (up) the handover threshold of the terminal 300. To be specific, if the traffic load of the base station 400 is below the traffic stability threshold, which means that the traffic is stable, the traffic management unit 420 may request the first handover management unit 430 to adjust (up) the handover threshold of the terminal 300 to return the virtually-reduced cell coverage of the base station 400 to the initial range, and return the virtually-enlarged cell coverage of the other base stations to the initial range.

The first handover management unit 430 may broadcast a request for adjustment of the handover threshold to one or two or more terminals 300 served by the base station 400 by transmitting a command message directing to adjust the handover threshold.

Figure 4:
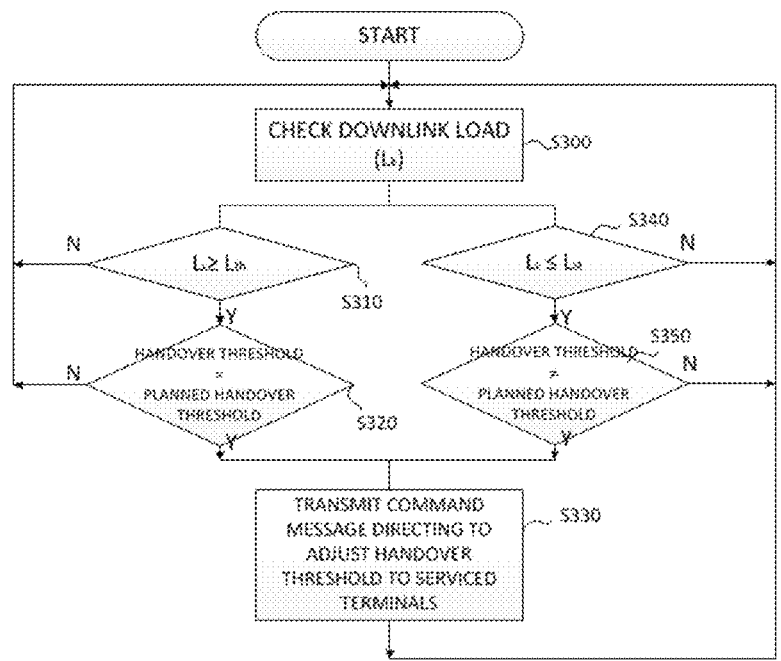
FIGS. 4 and 5 are schematic flowcharts provided to explain operation of the base station according to an embodiment.

Referring to FIG. 4, the operation of the base station 400 will be explained below in greater detail.

Figure 5:
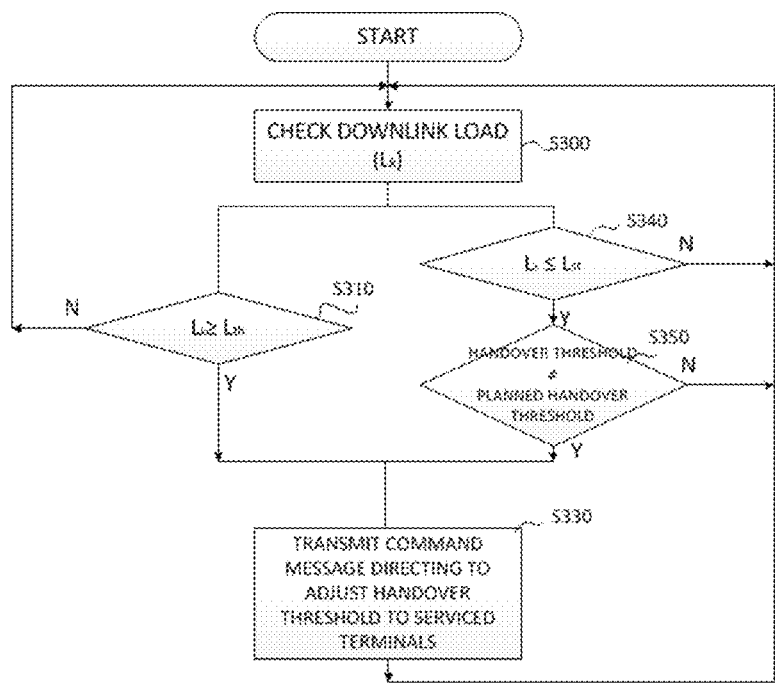

FIGS. 4 and 5 are schematic flowcharts provided to explain operation of the base station according to an embodiment.

Referring to FIG. 4, in one embodiment, at S300, the base station 400 measures downlink load Lk of the base station. The load transmitted from the base station 400 to the terminal 300 increases, as the number of terminals 300 served by the base station 400 increases. Accordingly, by measuring the downlink load Lk of the base station 400, it is possible to determining traffic overload of the base station 400.

Further, at S310, it is determined if the measured load Lk exceeds the traffic overload threshold Lth. The traffic overload threshold Lth may be set to a predetermined extent with respect to the total load of the base station 400. In one embodiment, the traffic overload threshold Lth may be set to a value corresponding to a predetermined ratio (e.g., 70%) of the total load of the base station 400. One with knowledge in the pertinent technical field will appreciate that the traffic overload threshold Lth may be modified within a range that does not evade the fundamental characteristic of an embodiment.

The traffic overload threshold Lth may be fixed per base station, or alternatively, changeable depending on the traffic load information received from the adjacent base stations. To be specific, the traffic overload threshold Lth may be changed to or above average load of the adjacent base stations. An object of an embodiment is to prevent traffic overload of the entire radio communication system, and therefore, if the adjacent base stations have traffic overloads, then the traffic overload threshold Lth is changed to or above average load of the adjacent base stations so that the condition for inducing handover to the adjacent base stations is lessened.

Further, at S320, the base station 400 may optionally determine if the handover threshold of the terminal 300 served by the base station equals to the planned handover threshold set at the terminal 300. This is done so, because if the (down) adjustment of the handover threshold is unlimitedly repeated, the excessive handover threshold adjustment can unstabilize the overall system and this can induced repetitive handover threshold adjustments.

If the base station 400 has traffic overload and the terminal 300 has the same handover threshold as the planned handover threshold, at S330, the base station 400 broadcasts a request for (down) adjustment of the handover thresholds to one or two or more terminals 300 served by the base station 400. The base station 400 may preferably broadcast a request for handover threshold (down) adjustment, by sending out a command message directing to adjust (down) the handover threshold to the terminals 300. On receiving the command message, the terminal 300 adjusts (down) the handover threshold, causing the cell coverage of the serving base station to virtually decrease, and the cell coverage of the other base stations to virtually increase.

Further, at S340, it may be determined if the load measured at S300 is below the traffic stability threshold Lst. At S340, the base station 400 may determine whether the traffic is stable or not. The traffic stability threshold Lst may be preferably set to a predetermined ratio (e.g., 60%) of the total load of the base station.

At S350, it may be determined if the handover threshold acquired from the terminal 300 served by the base station 400 is different from the planned handover threshold set at the terminal 300. At S350, excessive adjustment of handover threshold of the terminal 300 is prevented.

If the traffic of the base station 400 is stabilized and the handover threshold of the terminal 300 is different from the planned handover threshold, at S330, the base station 400 broadcasts a request for (up) adjustment of handover threshold to one or two or more terminals 300 served by the base station 400. The base station 400 may broadcast a request for (up) adjustment of the handover threshold to the terminals 300 by sending out a command message directing to adjust (up) the handover threshold. On receiving the command message, the terminal 300 adjusts (up) the handover threshold, and as a result, the cell coverage of the serving base station is virtually increased to original range, and the cell coverage of the other base stations is virtually decreased to the original range.

Further, referring to FIG. 5, operation at S320 at the base station 400 may be omitted according to an embodiment. This is to prevent the overall system from being unstabilized due to excessive (down) adjustment of the handover threshold made at once. That is, stability of the overall system is pursued by limiting the (down) adjustment of the handover threshold. To be specific, if the measured load exceeds the traffic overload threshold, the base station 400 repetitiously adjusts (down) the handover threshold until the load decreases below the traffic stability threshold. After that, if the base station 400 has stable traffic, at S330, the base station 400 broadcasts a request for (up) adjustment of the handover threshold to one or two or more terminals 300 served by the base station 400, by the operations at S340, S350.

Figure 6:
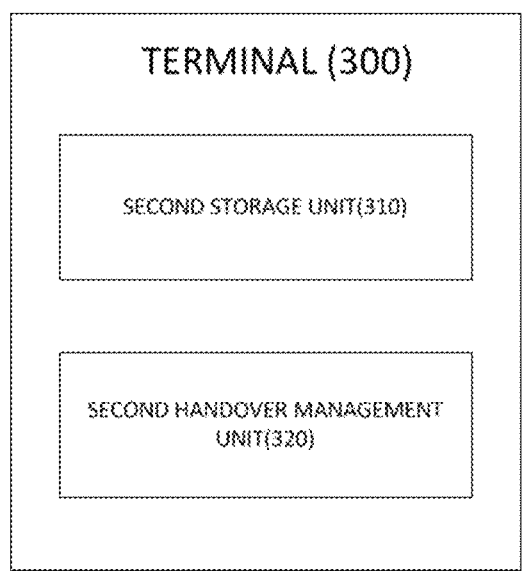
FIG. 6 illustrates the structure of the terminal according to an embodiment.

FIG. 6 illustrates the structure of the terminal according to an embodiment.

Referring to FIG. 6, the terminal according to an embodiment may include a second storage unit 310 which stores parameters for making handover request, and a second handover management unit 320 which requests adjustment of the handover threshold of the terminal 300 or handover to the other base stations, by using the parameters stored at the second storage unit 310.

The parameters for making handover request, stored at the second storage unit 310, may include one or two or more selected from among the handover threshold, planned handover threshold, amount of handover threshold adjustment, signal strength from the serving base station as periodically measured, and signal strength from the adjacent base stations.

The handover threshold, planned handover threshold and the amount of handover threshold adjustment may be used for adjusting handover threshold of the terminal 300, and the handover threshold, signal strength from the serving base station, and the signal strength from the adjacent base stations are used for determining if it is necessary to hand over to the adjacent base stations.

The handover threshold, planned handover threshold and the amount of handover threshold adjustment may be varied depending on whether the target base station is macro base station or femto base station. Since the macro base station and the femto base station have different cell coverage (which represents service available area), used frequency band and transmission electric energy, the above values may vary depending on whether the target base station is macro base station or femto base station.

If a request for adjustment of handover threshold is received from the serving base station, the second handover management unit 320 either increases or decreases the handover threshold stored at the second storage unit 310 as much as the handover threshold adjustment. If a request for reducing handover threshold is additionally received, the second handover management unit 320 determines if the handover threshold equals to the planned handover threshold, and decreases the handover threshold. Likewise, if a request for increasing handover threshold is additionally received, the handover management unit 330 determines if the handover threshold is different from the planned handover threshold and increases the handover threshold.

Further, using the signal strength of the adjacent base stations stored at the second storage unit 310, the second handover management unit 320 selects an adjacent base station where the strongest signal is received, and if the signal strength from the selected base station is greater than the sum of the signal strength of the serving base station and the handover threshold, requests the serving base station a handover to the selected base station. The operation of the terminal will be explained below with reference to FIG. 6.

Figure 7:
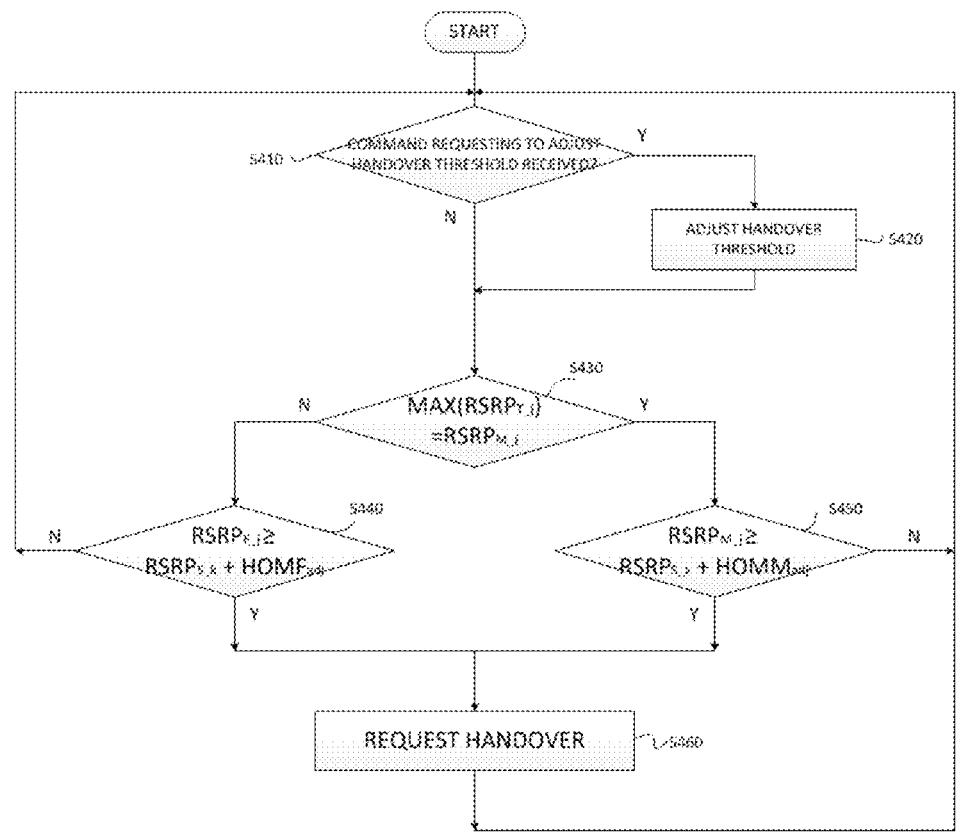
FIG. 7 is a schematic flowchart illustrating operation of the terminal according to an embodiment.

FIG. 7 is a schematic flowchart illustrating operation of the terminal according to an embodiment.

Referring to FIG. 7, at S410, the terminal 300 according to one embodiment determines if a request for adjusting handover threshold is received from the base station 400. The request for adjusting handover threshold may be transmitted by a message which directs to adjust handover threshold.

At S420, if there is a request for adjusting handover threshold from the base station 400, in response to the request, the handover threshold of the terminal 300 is adjusted (down or up) as much as the handover threshold adjustment. The amount of handover threshold adjustment for the macro base station and the amount of handover threshold adjustment for the femto base station may be different from each other.

In one embodiment, if there is a request for adjusting (down) the handover threshold from the base station 400, the terminal 300 may adjust (down) the handover threshold whenever there is such request for (down) adjustment. If the traffic overload of the base station 300 is resolved by repetitious (down) adjustment of the handover threshold, the base station 400 requests the terminal 300 (up) adjustment of the handover threshold. In response to the request, the terminal 300 may recover to the planned handover threshold by increasing the handover threshold.

Further, even when there is a request for (down) adjustment of handover threshold from the base station, if the handover threshold of the terminal 300 does not match the planned handover threshold, the handover threshold may not be adjusted (down). Accordingly, even when the presence of a request for adjusting handover threshold due to error at the base station, the handover threshold of the terminal 300 may be kept at a predetermined level so as not to be different from the planned handover threshold as much as the amount of handover threshold adjustment. Likewise, if there is a request for adjusting (up) the handover threshold from the base station, but if the handover threshold equals to the planned handover threshold, the handover threshold is not adjusted (up).

The terminal 300 constantly receives signals from not only the serving base station, but also the adjacent base stations, and determines by using the received signals whether or not to hand over from the serving base station to another base station. In a preferable embodiment, to determine whether or not to hand over to another base station, the terminal 300 may use the strength of the signals received from the serving base station and the adjacent base stations.

The terminal 300 selects a base station with the strongest reception signal, by measuring the strengths of the signals received from the adjacent base stations excluding the serving base station. Since the handover threshold may vary depending on whether the target base station is macro base station or femto base station, at 5430, it is determined whether the target base station is macro base station or femto base station. Depending on whether the target base station is macro base station or the femto base station, the cell coverage, used frequency band and electric energy vary, and subsequently, the handover threshold and the amount of handover threshold adjustment reflecting the above also vary depending on whether the target base station is macro base station or femto base station. Accordingly, in one embodiment, operation at 5430 is essential to determine whether or not to hand over the terminal.

If the base station having the strongest signal strength received at the terminal 300 is the femto base station, at S440, it is determined if the strength of the signal RSRPF_j received from the femto base station is greater than the sum of the strength of the signal RSRPS_k of the serving base station and the handover threshold HOMFadj of the femto base station. The handover threshold of the femto base station HOMFadj at S440 may be the handover threshold adjusted at S420, or the planned handover threshold.

Further, if the base station having the strongest signal strength received at the terminal 300 is the femto base station at 5430, at S450, it is determined if the strength of the signal RSRPM_j received from the macro base station is greater than the sum of the strength of the signal RSRPS_k of the serving base station and the handover threshold HOMMadj of the macro base station. The handover threshold of the macro base station HOMMadj at S450 may be the handover threshold adjusted at S420, or the planned handover threshold.

If it is determined that the strength of the signal received from the target base station at S440, S450 exceeds the sum of the signal strength of the serving base station and the handover threshold, since it is advantageous for the terminal 300 to receive signal from the target base station, at S460, a request for handover to the target base station is made. The terminal handover is performed by transmitting to the serving base station the information necessary for the handover including information about the target base station. The terminal handover will be explained in greater detail below with reference to FIG. 8.

Figure 8:
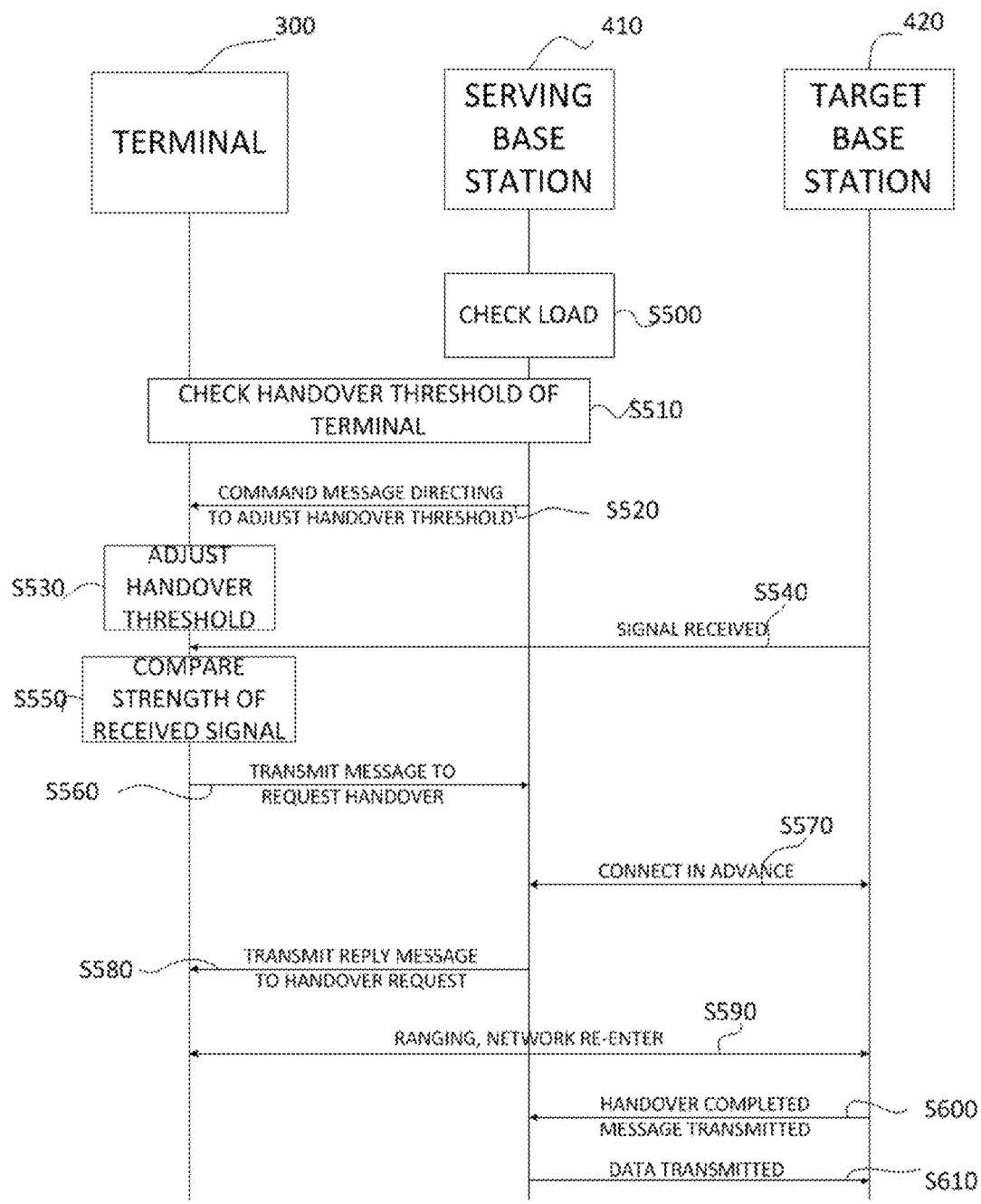
FIG. 8 is a flowchart illustrating the handover process of a terminal according to an embodiment.

FIG. 8 is a flowchart illustrating the handover process of a terminal according to an embodiment.

The terminal 300 currently receives service from the serving base station 410. At S500, to determine presence of traffic overload, the serving base station 410 measures downlink load of the serving base station 410 and determines if the measured load exceeds traffic overload threshold. The traffic overload threshold may be a fixed value, or variable one which varies according to the traffic load information of the adjacent base stations 420. In a preferable embodiment, the traffic overload threshold may be set to a value corresponding to a predetermined ratio (e.g., 70%) of the total load accommodatable at the base station. One skilled in the pertinent technical field may appreciate that the traffic overload threshold value may be modified within the scope that does not depart from the fundamental characteristic of an embodiment.

Further, at 5500, to determine the stability of the traffic, the serving base station 410 may determine if the measured downlink load is below the traffic stability threshold. The traffic stability threshold may be a fixed value, or variable one which varies according to the traffic load information of the adjacent base stations. In a preferable embodiment, the traffic stability threshold may be set to a value corresponding to a predetermined ratio (e.g., 60%) of the total load accommodatable at the base station.

Further, the traffic overload threshold and the traffic stability threshold may vary depending on the traffic load information received from the adjacent base stations. To be specific, the traffic overload threshold may be varied to or above average load of the adjacent base stations. An object to solve according to an embodiment is to prevent traffic overload of the overall radio communication system including the serving base station 410, and accordingly, if the adjacent base stations 420 have traffic overloads, the traffic overload threshold is varied to or above average load of the adjacent base stations to thereby lessen the degree of inducing handover to the adjacent base stations 420.

At S510, based on the stored handover threshold of the terminal 300, the serving base station 410 determines if the handover threshold equals to the planned handover threshold. The handover threshold of the macro base station and the handover threshold of the femto base station may be different from each other. Accordingly, the determination as to matching of the handover threshold with the planned handover threshold may be carried out both for the macro base station and the femto base station.

If the serving base station 410 is determined to be under traffic overload through operations at S500 and S510 and if it is determined that the handover threshold of the terminal 300 served by the serving base station 410 equals to the planned handover threshold, at S520, a request for adjusting handover threshold is broadcast to one or two or more terminals 300. The serving base station 410 may make a request for adjusting handover threshold by transmitting a message directing to adjust the handover threshold to the terminal 300.

If the serving base station 410 is determined to be stable through the determination at S500 and S510 and if it is determined that the handover threshold of the terminal 300 served by the serving base station 410 is different from the planned handover threshold, a request for adjusting the adjusted handover threshold to the planned handover threshold is broadcast to one or two or more terminals 300 served by the serving base station 410.

In response to a request for adjusting handover threshold from the serving base station 410, at S530, the terminal 300 adjusts the handover threshold. The amount of handover threshold adjustment of the macro base station and the amount of handover threshold adjustment of the femto base station may be different from each other.

At S540, the terminal 300 receives in real time basis signals from one or two or more adjacent base stations. The terminal 300 is connected to the serving base station 410, but searches in real time basis for the base stations that can provide better communication status.

At S550, the terminal 300 selects a base station having the strongest signal strength from among the adjacent base stations, and determines if the strength of the signal received from the selected base station exceeds the sum of the strength of the signal received from the serving base station and the handover threshold. Since the handover threshold of the macro base station and the handover threshold of the femto base station can be different from each other, it may be determined if the selected base station is macro base station or femto base station, and then a need for handover may be determined using the respectively corresponding handover thresholds.

If determining that handover to a specific target base station 420 is necessary, at S560, the terminal 300 transmits a request for handover to the serving base station 410. The request message may include information about the target base station 420.

At S570, in response to the handover request message received from the terminal 300, the serving base station 410 carries out pre-connection for handover with the target base station 420. In the pre-connection for handover, the serving base station 410 collects parameters for ranging between the terminal 300 and the target base station 420 and re-entry into network.

At S580, the serving base station 410 transmits a response message in reply to the handover request message to the terminal 300. The response message may include the parameters acquired by the serving base station 410 from the target base station 420.

At S590, the terminal 300 performs ranging with the target base station 420 and re-entry into network using the parameters included in the response message.

At S600, after completing the network re-setting, the target base station 420 transmits a handover complete message to the serving base station 410.

In response to the handover complete message received from the target base station 420, at S610, the serving base station 410 transmits the traffic data, which was maintained for the handover period, to the target base station 420. The target base station 420 transmits the received data to the terminal 300, to thereby minimize possible data loss during handover.

The foregoing exemplary embodiments and advantages are merely exemplary and are not to be construed as limiting the present invention. The present teaching can be readily applied to other types of apparatuses. Also, the description of the exemplary embodiments of the present inventive concept is intended to be illustrative, and not to limit the scope of the claims, and many alternatives, modifications, and variations will be apparent to those skilled in the art.

What is claimed is:

1. A terminal comprising:
a non-transitory storage unit which stores parameters for implementing a request for handover, the handover is from a serving base station to a target base station, the target base station selected from one or more base stations which are adjacent to said serving base station, said one or more base stations including one or more macro base stations and one or more femto base stations; and
a handover management unit which adaptively adjusts a handover threshold of the terminal or requests handover to the target base station using parameters stored at the non-transitory storage unit,
wherein the parameters for implementing the request for handover stored at the non-transitory storage unit comprise one or more selected from among: the handover threshold, planned handover threshold, amount of handover threshold adjustment; strength of signal periodically measured from a serving base station; and strength of signal from adjacent base station,
wherein the handover threshold, the planned handover threshold and the amount of handover threshold adjustment vary depending on whether the target base station is the macro base station or the femto base station, and
wherein the handover management unit adaptively controls handover from one of the macro base stations to one of the femto base stations, or from one of the femto base stations to one of the macro base stations.

2. The terminal of claim 1, wherein the handover management unit increases or decreases the handover threshold stored at the non-transitory storage unit as much as the amount of handover threshold adjustment, if a request for adjusting the handover threshold is received from the serving base station.

3. The terminal of claim 1, wherein the handover management unit decreases the handover threshold as much as the amount of handover threshold adjustment, if a request for decreasing the handover threshold is received from the serving base station and if it is determined that the handover threshold stored at the storage unit equals to the planned handover threshold.

4. The terminal of claim 3, wherein the planned handover threshold is greater than or equal to the handover threshold.

5. The terminal of claim 1, wherein the handover management unit selects the target base station with the strongest signal by using strength of signal received from the base stations which are adjacent to the serving base station and stored at the storage unit, and if determining that the strength of signal from the target base station exceeds a sum of the strength of signal from the serving base station and the handover threshold, requests handover to the target base station.

6. A method for requesting handover of a terminal, the method comprising:
determining if a request for adjusting a handover threshold is received from a serving base station;
adjusting the handover threshold if the request is received;
selecting a target base station with the strongest signal strength from among signals received from base stations adjacent to the serving base station, said one or more base stations including one or more macro base stations and one or more femto base stations;
determining if the strength of a signal received from the target base station exceeds a sum of the strength of a signal received from the serving base station and the handover threshold; and
if the strength of a signal received from the target base station exceeds the sum of the strength of a signal received from the serving base station and the handover threshold, requesting the serving base station for handover to the target base station,
wherein the handover threshold varies depending on whether the target base station is the macro base station or the femto base station.

7. The method of claim 6, wherein the step of adjusting the handover threshold is operating only if it is determined that the handover threshold equals to a planned handover threshold, wherein the planned handover threshold varies depending on whether the target base station is the macro base station or the femto base station.

* * * * *